(12) United States Patent
Kishi (10) Patent No.: US 8,767,077 B2
(45) Date of Patent: Jul. 1, 2014

(54) CAMERA APPARATUS FUNCTIONING IN RESPONSE TO RECEIVED SOFTWARE TRIGGER PACKETS

(75) Inventor: Junji Kishi, Hino (JP)

(73) Assignee: Toshiba Teli Corporation, Hino-shi (JP)

( * ) Notice: Subject to any disclaimer, the term of this patent is extended or adjusted under 35 U.S.C. 154(b) by 0 days.

(21) Appl. No.: 13/450,114

(22) Filed: Apr. 18, 2012

(65) Prior Publication Data

US 2012/0200719 A1 Aug. 9, 2012

Related U.S. Application Data

(63) Continuation of application No. PCT/JP2010/052452, filed on Feb. 18, 2010.

(30) Foreign Application Priority Data

Jan. 26, 2010 (JP) .................................. 2010-014754

(51) Int. Cl.
 *H04N 5/225* (2006.01)
(52) U.S. Cl.
 USPC .................................................... 348/207.11
(58) Field of Classification Search
 USPC ......................................... 348/207.11, 207.1
 See application file for complete search history.

(56) References Cited

U.S. PATENT DOCUMENTS

| 6,005,618 | A | 12/1999 | Fukui | |
|---|---|---|---|---|
| 2002/0135682 | A1 * | 9/2002 | Oka et al. | 348/211.3 |
| 2005/0151852 | A1 * | 7/2005 | Jomppanen | 348/218.1 |
| 2011/0205380 | A1 * | 8/2011 | Shirakawa | 348/211.9 |

FOREIGN PATENT DOCUMENTS

| JP | 2005-130030 A | | 5/2005 |
|---|---|---|---|
| JP | 2005130030 A | * | 5/2005 |
| JP | 3704712 B2 | | 10/2005 |
| JP | 2006-203817 A | | 8/2006 |
| JP | 2006203817 A | * | 8/2006 |
| JP | 2009296323 A | | 12/2009 |

OTHER PUBLICATIONS

"IIDC 1394-Based Digital Camera Specification Ver. 1.32," 1394 Trade Association, Document No. 2007009, 107 pages, Jul. 24, 2008.
International Search Report mailed May 18, 2010, issued in corresponding International Patent Application No. PCT/JP2010/052452, filed Feb. 18, 2010, 1 page.
International Preliminary Report on Patentability mailed Aug. 21, 2012, issued in corresponding International Application No. PCT/JP2010/052452, filed Feb. 18, 2010, 5 pages.
Extended European Search Report dated Jun. 14, 2013, issued in corresponding European Patent Application No. EP 10 84 4627, filed Feb. 18, 2010, 6 pages.

* cited by examiner

*Primary Examiner* — Gary C Vieaux
(74) *Attorney, Agent, or Firm* — Christensen O'Connor Johnson Kindness PLLC (57) ABSTRACT

An adder provided in a trigger delay control circuit adds the clock fixed delay value issued by the CPU to the clock timestamp information obtained by a software trigger detection circuit to output a timestamp information including a trigger delay of a fixed time, and a comparator compares the cycle timer value output from the cycle timer operation circuit with the timestamp output from the adder and including the trigger delay of the fixed time to output a trigger signal to the synchronization signal generation circuit for instructing to start exposure when the cycle timer value exceeds the timestamp including the trigger delay of the fixed time.

3 Claims, 6 Drawing Sheets

CAMERA APPARATUS FUNCTIONING IN RESPONSE TO RECEIVED SOFTWARE TRIGGER PACKETS

CROSS REFERENCE TO RELATED APPLICATIONS

This application is a Continuation Application of PCT Application No. PCT/JP2010/052452, filed Feb. 18, 2010 and based upon and claiming the benefit of priority from prior Japanese Patent Application No. 2010-014754, filed Jan. 26, 2010, the entire contents of all of which are incorporated herein by reference.

BACKGROUND OF THE INVENTION

1. Field of the Invention

The present invention relates to a camera apparatus which has a random trigger function, which is connected to a host device through an IEEE 1394 bus.

2. Description of the Related Art

There are camera apparatuses which have a random trigger function of starting exposure by a trigger signal that is supplied from outside at desired timing, as FA (Factory Automation) camera apparatuses which are connected to a host device through an IEEE 1394 bus.

As a technique of maintaining the accuracy of exposure start timing, a camera apparatus having the random trigger function uses a camera control means adopting a hardware trigger method, in which a transmission path for external trigger signals is provided between the host device and the camera apparatus, exposure of which is controlled by the host device, separately from the IEEE 1394 bus, and the camera apparatus receives an external trigger signal on the transmission path and starts exposure (see Patent Literature 1).

However, the camera control means of the hardware trigger method requires a connection interface for the external trigger signal transmission path between the host device and the camera apparatus besides an IEEE 1394 interface, and thus has a problem of complicating a connection interface between the host device and the camera apparatus.

As a camera control means which solves the above problem, there are cameras which have a so-called software trigger function (camera of a software trigger method) which notification of exposure start timing is performed by an IEEE 1394 packet (see Non patent Literature 1).

The camera control means of the software trigger method is realized by providing the host device with a software trigger generation and transmission means, and providing the camera apparatus, which is connected to the host device through an IEEE 1394 bus, with an IEEE 1394 packet reception circuit, a software trigger detection circuit, a synchronization signal generation circuit, an image sensor, an image sensor control circuit, and an IEEE 1394 packet transmission circuit. In the camera apparatus including the above constituent elements, the software trigger detection circuit analyzes an IEEE 1394 packet received by the IEEE 1394 packet reception circuit, and instructs the synchronization signal generation circuit to start exposure when the circuit detects a software trigger packet. The synchronization signal generation circuit notifies the image sensor control circuit of exposure timing in accordance with the instruction. The image sensor control circuit performs exposure control based on the exposure timing for the image sensor. After exposure is finished, the image sensor transmits an obtained image to the image sensor control circuit. The image sensor control circuit converts the obtained image (image data) into an IEEE 1394 packet and transmits the packet to the IEEE 1394 bus through the IEEE 1394 packet transmission circuit.

Figure 4:
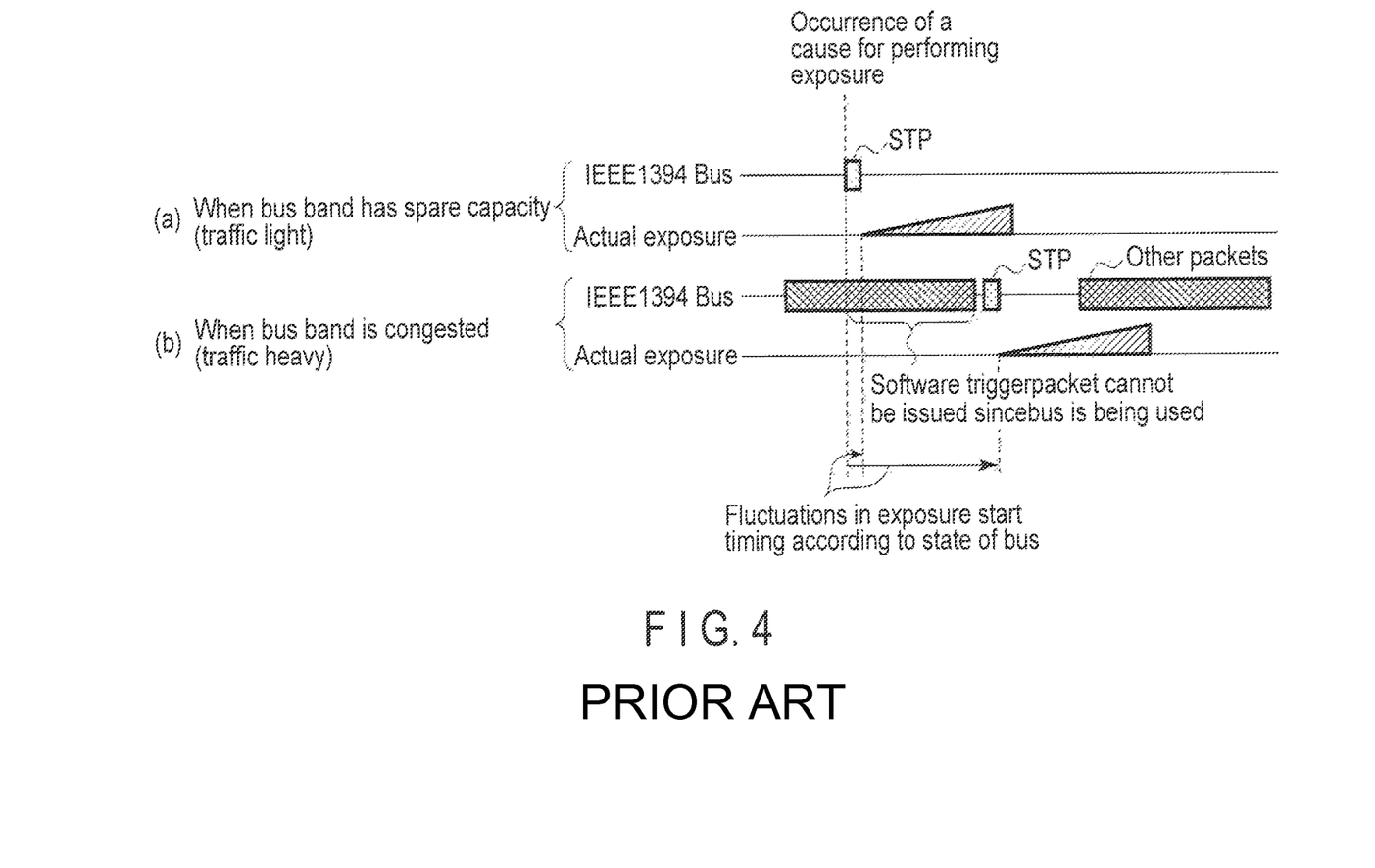
FIG. 4 is a timing chart for explaining a conventional software trigger operation, which corresponds to FIG. 3.

However, in the camera control means of the software trigger method, the time at which the software trigger packet arrives at the camera apparatus varies (fluctuates) according to the condition of use of the IEEE 1394 bus (traffic condition of the bus band), as illustrated in FIG. 4. This time fluctuation varies the accuracy of the exposure start timing, and thus the software trigger method has a problem of being inferior to the hardware trigger method in imaging performance.

Therefore, in prior art, a camera control, means of the hardware trigger method is used only in an IEEE 1394 camera system which requires exposure start timing of high accuracy, and a camera control means of the software trigger method, hardware connection of which is relatively easy, is used in an IEEE 1394 camera system which does not require exposure start timing of high accuracy.

CITATION LIST

Patent Literature

PTL 1: Jpn. Pat. No. 3704712

Non-Patent Literature

NPL 1: IIDC 1394-based Digital Camera Specification Ver. 1.32

BRIEF SUMMARY OF THE INVENTION

Technical Problem

As described above, in a camera apparatus having the random trigger function, a camera control means of the hardware trigger method requires a connection interface for the external trigger signal transmission path between the host device and the camera apparatus in addition to the IEEE 1394 interface, and has the problem of complicating the connection interface between the host device and the camera apparatus. In a camera control means of the software trigger method, the time at which a software trigger packet arrives at the camera apparatus varies (fluctuates) according to the bus use condition (traffic condition of the bus band), and thus the software trigger method has the problem that the accuracy of the exposure start timing varies, and the imaging performance is inferior to the hardware trigger method.

The present invention has been made in consideration of the above circumstances.

Solution to Problem

One embodiment of the present invention is a camera apparatus which includes a random trigger function of controlling exposure timing of an image sensor, based on timestamp information that is included in a software trigger packet received, through an IEEE 1394 bus, comprising: a cycle timer operation circuit which outputs a cycle timer value that is synchronized with operation of the IEEE 1394 bus; an IEEE 1394 packet reception circuit which receives a packet on the IEEE 1394 bus; a software trigger detection circuit which detects the software trigger packet from the packet received by the IEEE 1394 packet reception circuit; a fixed delay value setting means which outputs a fixed delay value to perform a fixed trigger delay for the timestamp information included in the software trigger packet that is detected by the software trigger detection circuit; and an exposure control means which receives the cycle timer value, the timestamp information, and the fixed delay value, and instructs the image sensor to start exposure when the cycle timer value exceeds a value which is obtained by adding the fixed delay value to the timestamp information.

Another embodiment of the present invention is an IEEE 1394 camera system which connects a host device to a camera apparatus including an imaging element through an IEEE 1394 bus, wherein the host device includes a software trigger packet, generation means which transmits a software trigger packet, when a phenomenon for which exposure is to be performed occurs, to the IEEE 1394 bus, the software packet includes a cycle timer value at the time the phenomenon occurs as a timestamp, the camera apparatus comprises: an IEEE 1394 interface which includes a cycle timer operation circuit that outputs a cycle timer value synchronized with the IEEE 1394 bus, and a software trigger packet detection means that detects the software trigger packet, a fixed delay setting means which outputs a fixed delay value determined with the unit of IEEE 1394 clock to perform a fixed trigger delay for the timestamp included in the software trigger packet detected by the software trigger packet detection means; and a trigger delay control means which receives the clock cycle timer value output from the cycle timer operation circuit, the timestamp output from the software trigger packet detection means, and the clock fixed delay value output from the fixed delay setting means, compares the cycle timer value with the timestamp information, and instructs the imaging element to start exposure after a fixed trigger delay time according to the fixed delay value has passed when the cycle timer value exceeds the timestamp.

ADVANTAGEOUS EFFECTS OF INVENTION

According to the present invention, in a camera apparatus which includes a random trigger function achieved by a software trigger method, it is possible to perform exposure control at constantly fixed timing for occurrence of a cause for performing exposure such as an instruction of performing exposure at desired exposure timing, regardless of the state of use of the IEEE 1394 bus. Thereby, it is possible to provide a camera apparatus and an IEEE 1394 camera system which realize a trigger function with high time accuracy while easy connection of the software trigger method is maintained.

DETAILED DESCRIPTION OF THE INVENTION

An embodiment of the present invention will be explained hereinafter with reference to drawings. A camera apparatus according to an embodiment of the present invention is used as a factory automation (FA) camera or a machine vision camera. The camera apparatus is connected to an IEEE 1394 bus, and exposure of the camera apparatus is controlled by a host device (hereinafter referred to as a "host PC") through the IEEE 1394 bus.

Figure 3:
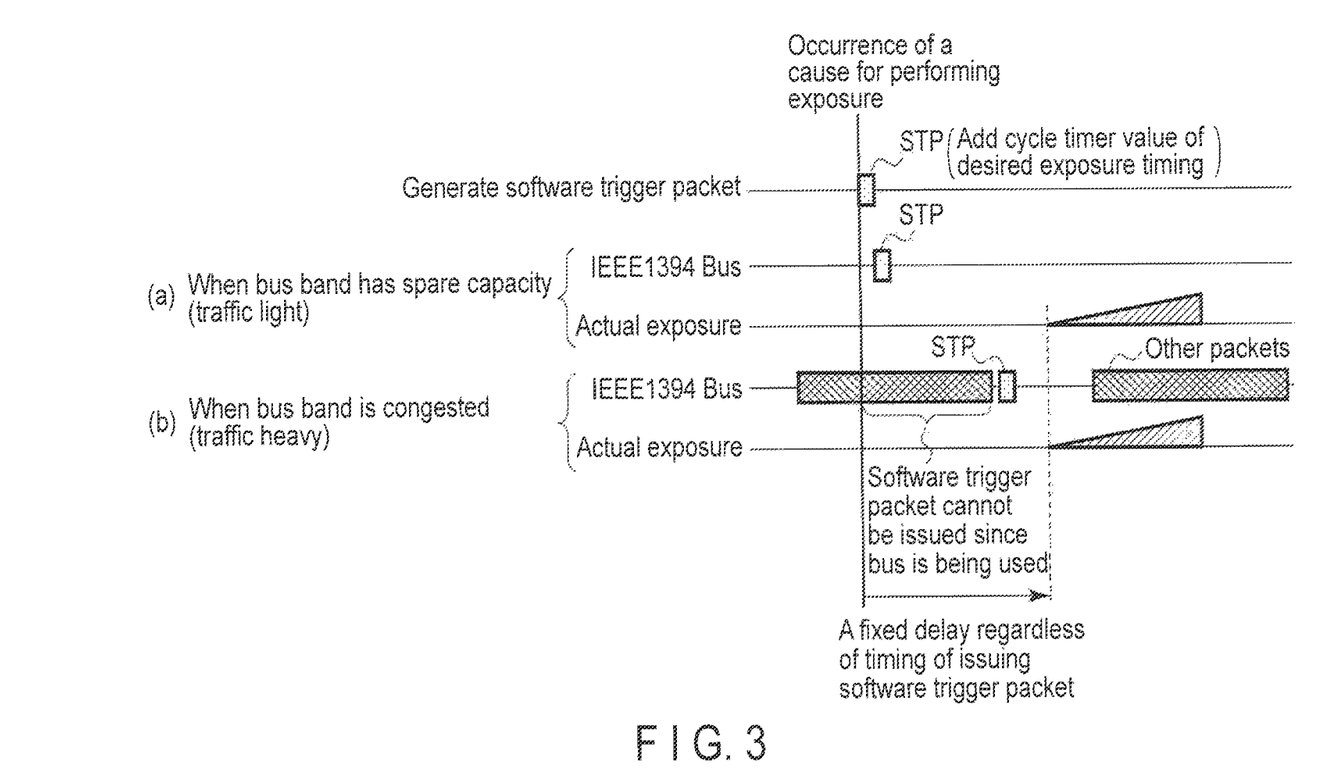
FIG. 3 is a timing chart for explaining operation of the camera apparatus according to the embodiment.
Figure 5:
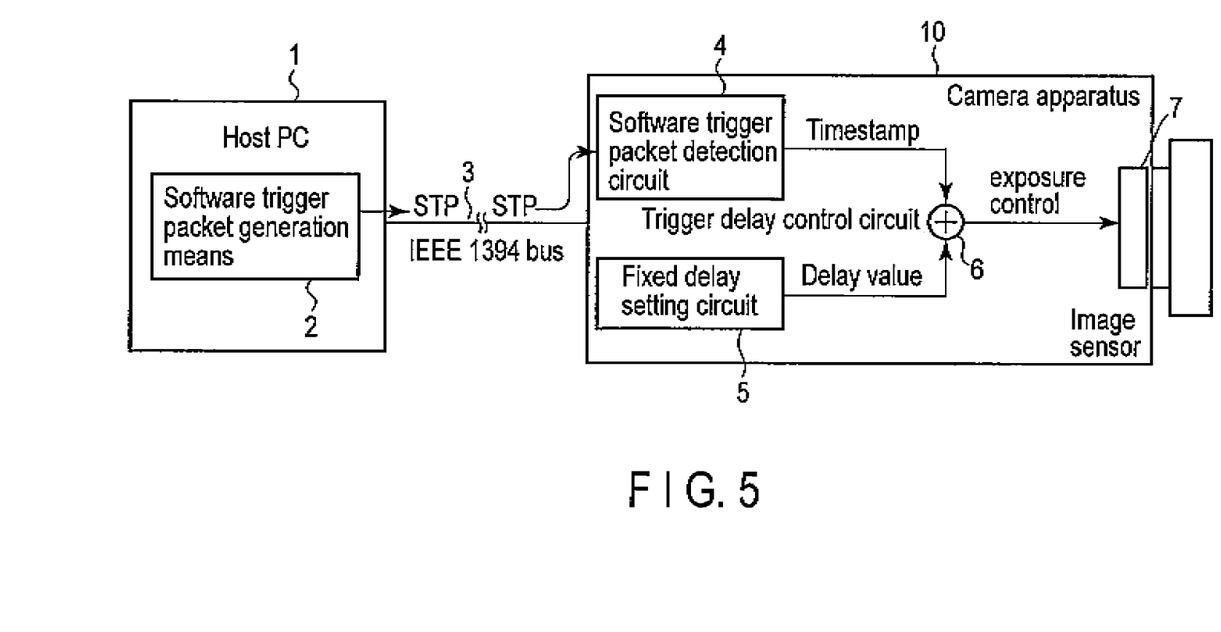
FIG. 5 is a block diagram of a structure of an IEEE 1394 camera system, to which the camera apparatus according to the embodiment is connected.
Figure 6:
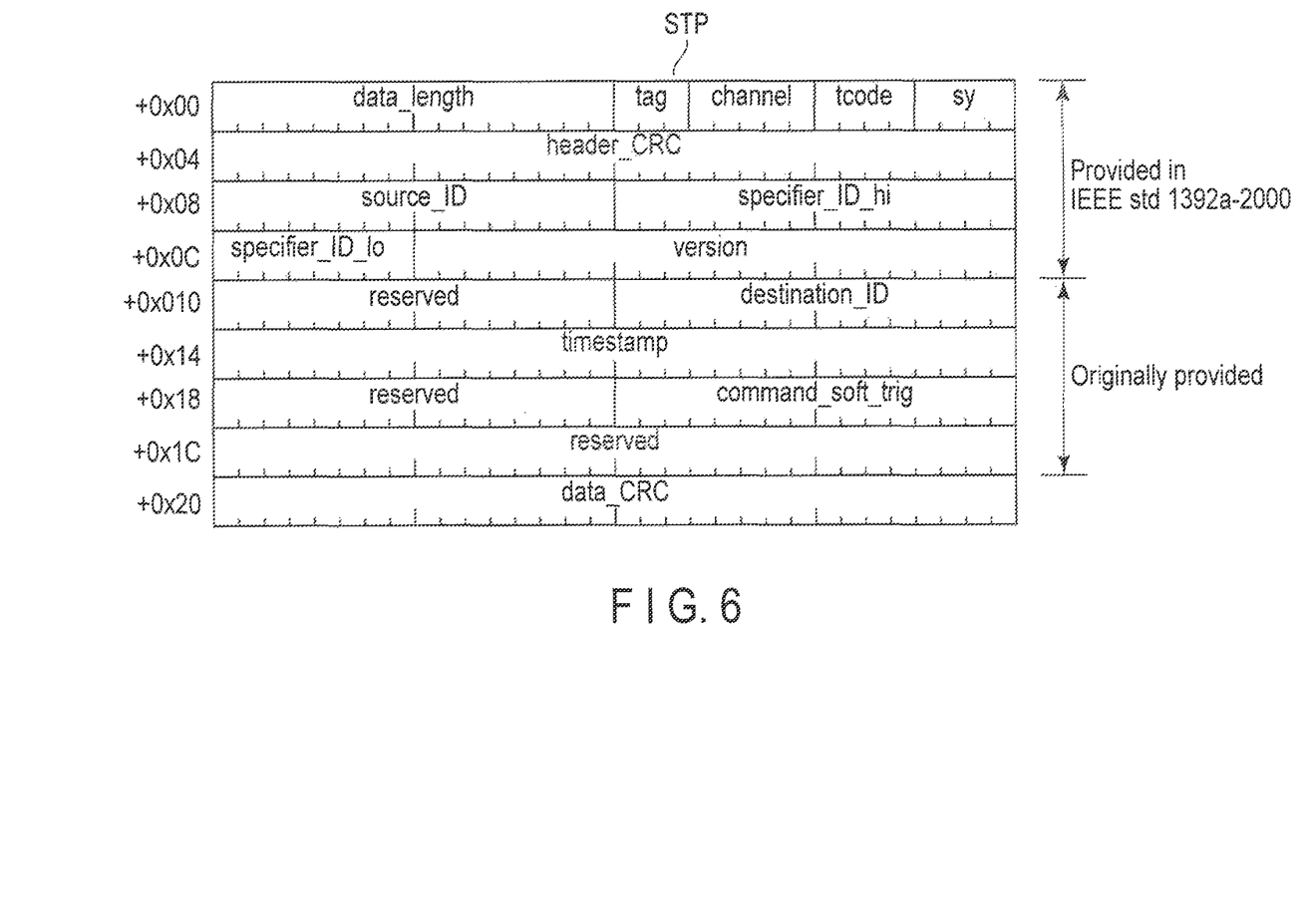
FIG. 6 is a diagram it a structure of a software trigger packet which is used for the camera apparatus of the embodiment.

For explaining the embodiment of the camera apparatus according to the present invention, explained is an outline of an IEEE 1394 camera system, to which the camera apparatus according to the embodiment of the present invention is connected, with reference to FIG. 5, FIG. 6 and FIG. 3.

As illustrated in FIG. 5, the IEEE 1394 camera system, to which the camera apparatus according to the embodiment of the present invention is connected, comprises a host PC 1, an IEEE 1394 bus 3, and a camera apparatus 10. Although FIG. 5 illustrates only one camera apparatus 10 which is connected to the IEEE 1394 bus 3 and to be controlled by the host PC 1, a plurality of camera apparatuses can be connected to the system.

The host PC 1 includes a software trigger packet generation means 2. When a phenomenon for which exposure is to be performed occurs, the host PC 1 generates a software trigger packet (STP) by the software trigger packet generation means 2 each time when the phenomenon occurs, and transmits the packet to the IEEE 1394 bus 3, FIG. 6 illustrates a structure of the software trigger packet (STP).

The software trigger packet (FTP) which is generated and issued by the software trigger packet generation means 2 each time a phenomenon for which exposure is to be performed occurs conforms to the Global Asynchronous Stream Packet defined by IEEE std 1394a-2000, as illustrated in FIG. 6. In a packet structure illustrated in FIG. 6, the item "data_length" indicates a data length between "header_CRC" and "data_CRC", which is 6×4 bytes=24 bytes (0x0018). The item "tag" is fixed to 0x3 by the standard. The item "channel" designates a channel which is used for data communication. The item "tcode", in which generally 31 (0x1F) is described, is fixed to 0xA by the standard. The item "sy" is fixed to 0x0 by the standard. The item "header_CRC" describes CRC-32 of the header part. The item "source_ID" describes an ID of a node which issues a software trigger, such as the host PC. The item "specifier_ID_hi/lo" describes an organizationally unique identifier (OUI) of 24 bits. The item "version" indicates a version of the packet structure. A part following the above data defining part is a data defining part which defines a software trigger packet (STP) applied to the embodiment of the present invention. The item. "reserved" indicates a reserved field. The item "destination_ID" indicates a node ID of the camera apparatus 10 according to the embodiment. The item "timestamp" describes a cycle timer value at the time when a cause for exposure occurs. The item "command_soft_trig" describes a unique code which indicates that the packet is a software trigger packet. The item "data_CRC" describes CRC-32 of a data part including the header_CRC and subsequent items. The cycle timer value of a clock defined by IEEE 1394 and described in the above item "timestamp" is recognized as timestamp information in the camera apparatus 10. By virtue of the above structure, the camera apparatus 10 can obtain a cycle timer value of a clock at the time when a cause for exposure occurs, simultaneously with reception of a software trigger packet.

The camera apparatus 10 which receives the software trigger packet (STP) includes an IEEE 1394 interface, and includes a cycle timer operation circuit (not shown: see FIG. 1) and a software trigger packet detection circuit 4 in the interface. The camera apparatus 10 also includes a fixed delay setting circuit 5, a trigger delay control circuit 6, and an imaging circuit 7 which includes an image sensor.

The software trigger packet detection circuit 4 analyzes a packet on the IEEE 1394 bus 3, detects a software trigger packet (STP) from a code described in the item "command_soft_trig" of the packet. Then, the software trigger packet detection circuit 4 recognizes a cycle timer value of a clock described in the item "timestamp" of the packet as timestamp information, and transmits the timestamp information to the trigger delay control circuit 6.

The fixed delay setting circuit 5 outputs a fixed delay value of the clock to perform fixed trigger delay for the timestamp information (cycle timer value described in the item "timestamp") which is included in the software trigger packet (STP) detected by the software trigger packet detection circuit 4. As the fixed delay value, the fixed delay setting circuit 5 stores in advance a value of a clock timing according to a clock frequency provided in IEEE 1394, which indicates a desired delay time which is larger than the maximum value of a time width (time fluctuation range) that is caused by shift of reception timing of the software trigger packet (STP) due to traffic fluctuations (bus band traffic degree) of the IEEE 1394 bus 3.

The trigger delay control circuit 6 receives the cycle timer value of a clock which is output from the cycle timer operation circuit in the IEEE 1394 interface, the timestamp information (cycle timer value of a clock at the time when a cause for exposure occurs) output from the software trigger packet detection circuit 4, and the clock fixed delay value output from the fixed delay setting means, and compares the cycle timer value with the timestamp information for each clock. When the cycle timer value exceeds the timestamp information, the trigger delay control circuit 6, functioning as an exposure control circuit as shown in FIG. 5, instructs the image sensor of the imaging circuit 7 to start exposure, after the fixed trigger delay time according to the fixed delay value has passed.

The imaging circuit 7 obtains image data by controlling the image sensor in accordance with the instruction to start exposure. After exposure is finished, the imaging circuit 7 converts the image data obtained from the image sensor into an IEEE 1.394 packet, and transmits the packet to the IEEE 1394 bus 3.

FIG. 3 (a) and FIG. 3 (b) illustrate an exposure control timing of the camera apparatus 10 in the above embodiment. FIG. 4 (a) and FIG. 4 (b) illustrate an exposure control timing of a camera apparatus according to a conventional, software trigger method. Each of FIG. 3 (a) and FIG. 4 (a) illustrates exposure control timing in the case where the bus band of the IEEE 1394 bus 3 has spare capacity (traffic is light), and each of FIG. 3 (b) and FIG. 4 (b) illustrates exposure control timing in the case where the bus band of the IEEE 1394 bus 3 is congested (traffic is heavy). In exposure control according to the embodiment of the present invention, it is possible to constantly perform exposure control at fixed timing according to a fixed delay value, regardless of the state of use of the IEEE 1394 bus, for occurrence of a cause for performing exposure (exposure instruction at desired exposure timing). Thereby, it is possible to prevent fluctuations in the time at which the software trigger packet reaches the camera apparatus according to the state of use of the IEEE 1394 bus 3 (traffic state of the bus band) as illustrated in FIG. 4, and prevent the problem of time fluctuations in the exposure start timing. Thereby, it is possible to realize a camera system which has a software trigger function with exposure timing of high accuracy.

According to the IEEE 1394 camera system including the above camera apparatus 10, it is possible to perform exposure control at constantly fixed timing for occurrence of a phenomenon, for which exposure is to be performed, regardless of the state of use of the IEEE 1394 bus.

In the above IEEE 1394 camera system, although the fixed delay setting circuit 5 provided in the camera apparatus 10 can set a desired delay time (delay time with the unit of clock) for each camera apparatus, it is also possible to perform direct control of the exposure start timing including a delay of a fixed time by the host PC 1, by adding clock delay information, or clock timestamp information which corresponds to desired exposure start in view of a fixed delay, to the software trigger packet (STP).

As described above, in the IEEE 1394 camera system of the software trigger method, it is possible to widely improve the exposure timing accuracy of the software triggering. Therefore, it is possible to use software triggering in IEEE 1394 camera systems, which require exposure timing of high accuracy that cannot be realized in hardware triggering in prior art, and simplify the connection line.

Figure 1:
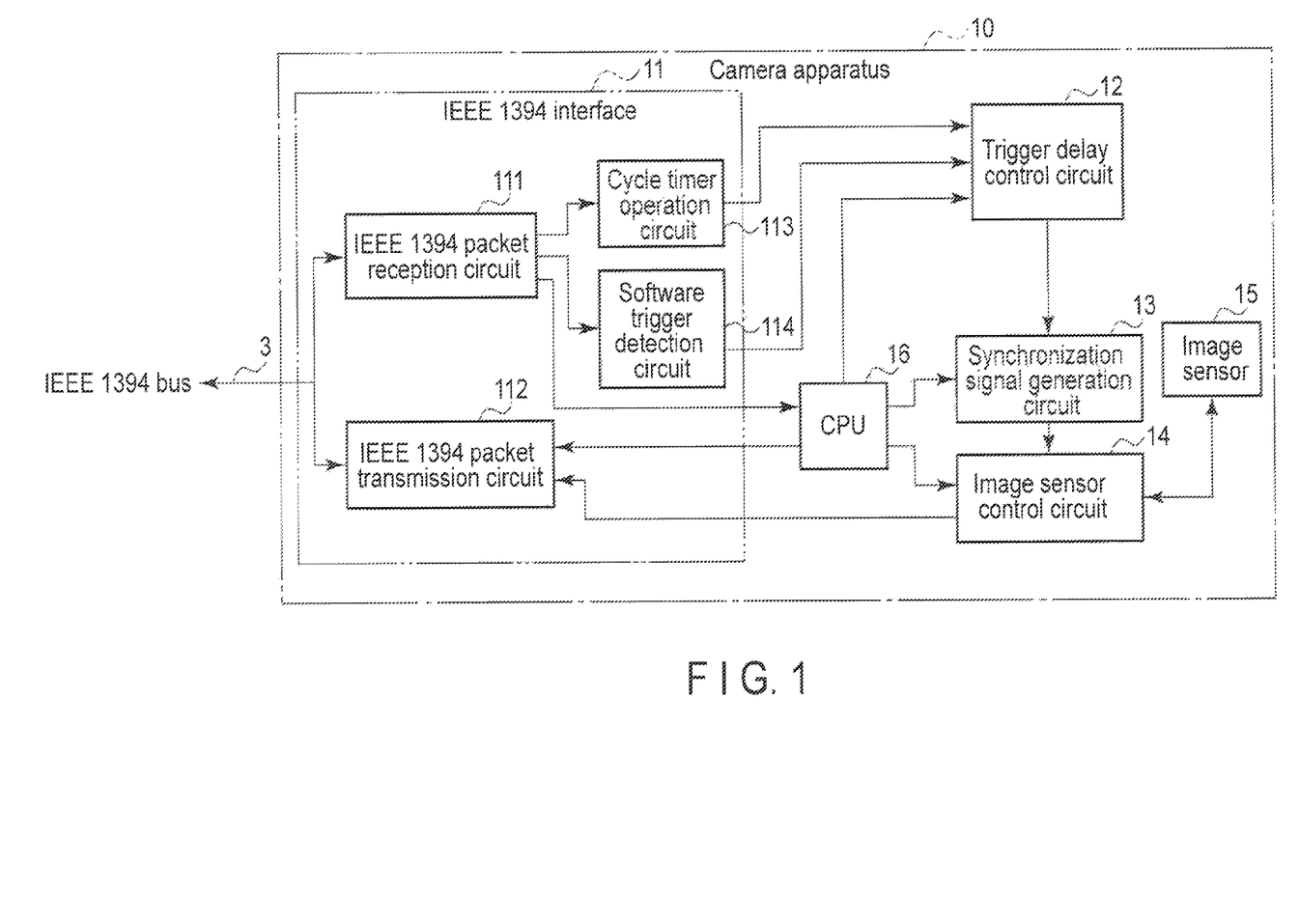
FIG. 1 is a block diagram of a structure of a camera apparatus according to an embodiment of the present invention.
Figure 2:
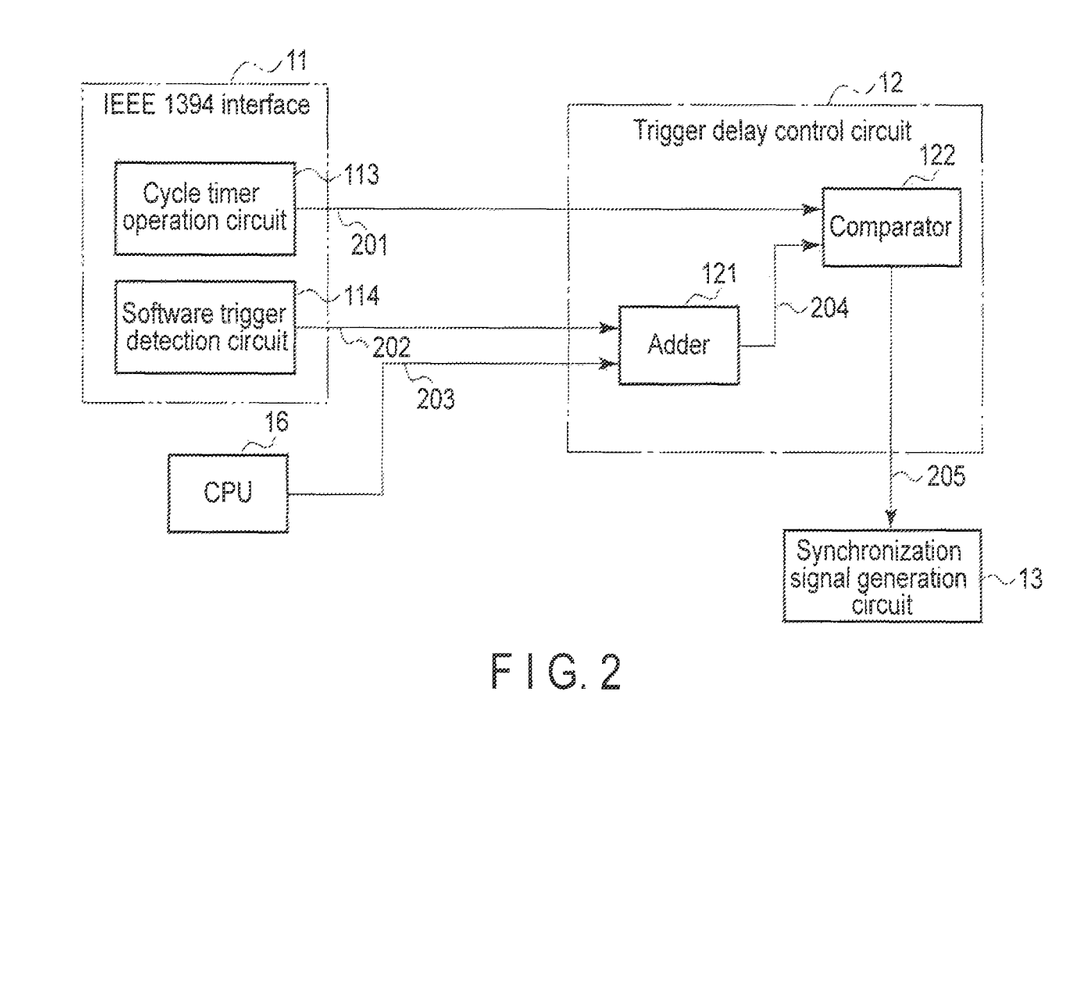
FIG. 2 is a block diagram of a structure of a main part of the camera apparatus according to the embodiment.

More detailed structure and operation of the camera apparatus 10 according to the above embodiment will be explained hereinafter with reference to FIG. 1 and FIG. 2. FIG. 1 illustrates the structure of the camera apparatus 10, and FIG. 2 illustrates a structure of a trigger delay control circuit 12 provided in the camera apparatus 10.

As illustrated in FIG. 1, the camera apparatus 10 according to the embodiment of the present invention comprises an IEEE 1394 interface control circuit 11, a trigger delay control circuit 12, a synchronization signal generation circuit 13, an image sensor control circuit 14, an image sensor 15, and a CPU 16. Among the constituent elements of the camera apparatus 10 illustrated in FIG. 5, the software trigger packet detection means 4 is realized by an IEEE 1394 packet reception circuit 111 and a software trigger detection circuit 114 which are included in the IEEE 1394 interface control circuit 11 illustrated in FIG. 1, the fixed delay setting circuit 5 is realized by the CPU 16 also illustrated in FIG. 1, the trigger delay control circuit 6 is realized by a cycle timer operation circuit 113 and the trigger delay control circuit 12 also illustrated in FIG. 1, and the imaging circuit 7 is realized by the synchronization signal generation circuit 13, the image sensor control circuit 14, and the image sensor 15 also illustrated in FIG. 1.

In the camera apparatus 10 illustrated in FIG. 1, the IEEE 1394 interface circuit 11 manages control of IEEE 1394 packets which are transmitted and received through the IEEE 1394 bus 3. The IEEE 1394 interface circuit 11 includes the IEEE 1394 packet reception circuit 111, the IEEE 1394 packet transmission circuit 112, the cycle timer operation circuit 113, and the software trigger detection circuit 114.

The IEEE 1394 packet reception circuit 111 has a packet reception processing function of monitoring the IEEE 1394 bus 3 and receiving packets on the bus. The IEEE 1394 packet transmission circuit 112 has a packet transmission processing function of transmitting packets to the IEEE 1394 bus 3.

The cycle timer operation circuit 113 has a processing function of performing counting with the unit of clock provided in IEEE 1394 in synchronization with a cycle start packet on the IEEE 1394 bus 3, which is received by the IEEE 1394 packet reception circuit 111, and transmitting the cycle timer value which is updated for each clock to the trigger delay control circuit 12.

The software trigger detection circuit 114 has a processing function of detecting a software trigger packet (STP) among packets on the IEEE 1394 bus 3 which are received by the IEEE 1394 packet reception circuit 111, obtaining timestamp information (cycle timer value at the time of occurrence of a phenomenon, for which exposure is to be performed) from the software trigger packet (STP), and transmitting the timestamp information to the trigger delay control, circuit 12 in addition to notification of software trigger reception.

The trigger delay control circuit 12 generates a trigger signal which issues an instruction to start exposure, based on the cycle timer value that is output from the cycle timer operation circuit 113 in response to notification of software trigger reception from the software trigger detection circuit 114, the timestamp information obtained by the software trigger detection circuit 114, and a fixed delay value issued by the CPU 16. As illustrated in FIG. 2, the trigger delay control circuit 12 includes an adder 121 and a comparator 122.

The adder 121 has a processing function of adding the clock fixed delay value 203 issued by the CPU 16 to the clock timestamp information 202 obtained by the software trigger detection circuit 114, and outputting a timestamp 204 including a trigger delay of a fixed time.

The comparator 122 has a processing function of comparing the cycle timer value 201 output from the cycle timer operation circuit 113 with the timestamp 204 which is output from the adder 121 and includes the trigger delay of the fixed time, and outputting a trigger signal 205 which instructs the image sensor to start exposure when the cycle timer value 201 exceeds the timestamp 204 including the trigger delay of the fixed time. The comparator 122 performs comparison including overflow processing at a turning point of the cycle timer.

The synchronization signal generation circuit 13 has a processing function of generating and outputting an exposure timing signal which is synchronized with the clock cycle, in response to the trigger signal output from the trigger delay control circuit 12.

The image sensor control circuit 14 has a processing function of controlling exposure of the image sensor 15 based on the exposure timing signal output from the synchronization signal generation circuit 13, obtaining image data from the image sensor 15, converting the obtained image data into a packet with finishing of exposure, and transmitting the packet to the IEEE 1394 packet transmission circuit 112.

Operation of the image sensor 15 is controlled, by the image sensor control circuit 14, based on the synchronization signal generated by the synchronization signal generation circuit 13. The image sensor 15 outputs image data, which is imaged by an optical system (not shown), to the image sensor control circuit 14. The image sensor 15 is formed of an area image sensor such as a CMOS sensor and a COD sensor.

The CPU 16 manages control of the whole camera apparatus 10. In the present embodiment, the CPU 16 has a function of the fixed delay setting circuit 5 illustrated in FIG. 5. The CPU 16 has a function of managing a preset fixed delay value with the unit of clock for performing a fixed trigger delay for the timestamp information (cycle timer value described in the item "timestamp") included in the software trigger packet (STP), and transmitting the fixed delay value to the trigger delay control circuit 12 through an internal bus.

Operation of the camera apparatus 10 having the above structure will be explained hereinafter with reference to a timechart illustrated in FIG. 3.

First, the host PC 1 transmits a software trigger packet (STP) which includes a timestamp of the trigger occurrence time based on the cycle timer. The software trigger packet (STP) is input to the camera apparatus 10 through the IEEE 1394 bus 3.

In the camera apparatus 10, the IEEE 1394 packet reception circuit 111 provided in the IEEE 1394 interface control circuit 11 receives the packet on the IEEE 1394 bus 3.

The software trigger detection circuit 114 analyzes the packet received by the IEEE 1394 packet reception circuit 111, and determines whether the received packet is a software trigger packet (STP) or not. In the present embodiment, the software trigger detection circuit 114 recognizes that the received packet is a software trigger packet (STP) from the code which is described in the item "command_soft_trig" illustrated in FIG. 6, and detects a software trigger packet. The software trigger detection circuit 114 also obtains the timestamp information (cycle timer value at which a cause for exposure occurs) which is described in the item "timestamp" from the detected software trigger packet (STP), and transmits the timestamp information to the trigger delay control circuit 12 in addition to notification of software trigger reception.

In response to notification of trigger reception from the software trigger detection circuit 114, the trigger delay control circuit 12 generates a trigger signal which instructs the image sensor to start exposure, based on the cycle timer value output from the cycle timer operation circuit 113, the timestamp information obtained by the software trigger detection circuit 114, and the fixed delay value issued by the CPU 16. Specifically, the adder 121 provided in the trigger delay control circuit 12 adds the fixed delay value 203 which is determined in clocks and issued from the CPU 16 to the timestamp information 202 determined in clocks and obtained by the software trigger detection circuit 114, and outputs a timestamp 204 which includes a trigger delay of a fixed time. The comparator 122 compares the cycle timer value 201 which is output from the cycle timer operation circuit 113 with the timestamp 204 which is output from the adder 121 and includes the trigger delay of the fixed time. When the cycle timer value 201 exceeds the timestamp 204 including the trigger delay of the fixed time, the comparator 122 transmits a trigger signal 205 which instructs the image sensor to start exposure to the synchronization signal generation circuit 13.

In response to the instruction (trigger signal 205 to start exposure, the synchronization signal generation circuit 13 generates an exposure timing signal which is synchronized with the clock cycles, transmits the exposure timing signal to the image sensor control, circuit 14, and notifies the image sensor control circuit 14 of exposure timing of the image sensor 15.

Based on the exposure timing, the image sensor control circuit 14 performs control of exposure of the image sensor 15. After exposure is finished, the image sensor control circuit 14 converts image data obtained from the image sensor 15 into a form (packet) which can be transmitted through the IEEE 1394 bus 3, and transmits the packet to the IEEE 1394 packet transmission circuit 112. The IEEE 1394 packet transmission circuit 112 outputs the image data packet received from the image sensor control circuit 14 to the IEEE 1394 bus 3.

FIG. 3 (a) and FIG. 3 (b) illustrate operation timing of the above exposure control. When a cause for exposure (desired exposure timing) occurs, the host PC 1 generates a timestamp based on the value of the cycle timer at the point in time. Thereafter, the host PC 1 generates a software trigger packet (STP), to which the timestamp is added. The timing of issuing a software trigger packet (STP) fluctuates according to the operation (bus band) state of the IEEE 1394 bus 3, in the same manner as the case of adopting a conventional software trigger technique. However, the camera apparatus 10 which receives the software trigger packet (STP) can recognize the desired exposure timing, regardless of fluctuations in the issue timing. Thereby, the camera apparatus 10 can start exposure at timing with a fixed delay from the desired exposure timing.

As described above, in the camera apparatus 10 according to the embodiment of the present invention, software trigger input can be delayed as desired by the trigger delay control circuit 12. Therefore, the cycle timer value at the time when a cause for exposure occurs is described in the software trigger packet (STP) transmitted from the host PC 1, as desired exposure start timing at the time axis by the cycle timer, and thereby it is possible to realize an exposure delay controlling function which does not include fluctuations in packet issue which depend on the traffic state of the bus band, as illustrated in FIG. 3 (a) and FIG. 3 (b). This function is realized by designating an exposure delay time which is sufficiently larger than the range of the time fluctuations of the communication line (IEEE 1394 bus 3). Thereby, it is possible to provide a camera apparatus which has a new software trigger with high time accuracy, while easy connection of the software trigger is maintained.

The present invention is not limited to the above embodiment, but can be carried out with modified constituent elements within a range not departing from the gist of the invention. For example, in the above embodiment, the comparator 122 transmits a trigger signal 205 which instructs the image sensor to start exposure to the synchronization signal generation circuit 13, when the cycle timer value 201 exceeds the timestamp 204 which includes a trigger delay of a fixed time. However, the present invention is not limited to this structure, but the comparator 122 may perform processing of transmitting the trigger signal 205 which instructs the image sensor to start exposure to the synchronization signal generation circuit 13, when the cycle timer value 201 reaches the timestamp 204 which includes the trigger delay of the fixed time. In addition, although in the above embodiment the CPU 16 which manages control of the whole camera apparatus 10 manages a preset fixed delay value which is determined with the unit of clock, the present invention is not limited to this structure, but may have a structure of providing each camera apparatus with hardware in which a desired fixed delay value is set. As another example, it is possible to adopt a structure in which the host PC 1 directly controls the exposure start timing including a delay of a fixed time, by adding delay information for each clock, or timestamp information for each clock that corresponds to desired exposure start, to which a fixed delay is added, to the software trigger packet (STP).

In addition, although in the above embodiment the software trigger packet (STP) is formed of a Global Asynchronous Stream Packet, the present invention is not limited to it, but it is possible to use a packet which can be transmitted with timestamp information added to the software trigger, such as an asynchronous write request for data block packet.

In addition, although the above embodiment has the structure in which the host PC 1 transmits the software trigger packet (STP), the present invention is not limited to the structure, but, for example, a software trigger generation device which is independent of the host PC and the camera apparatus may transmit the software trigger packet (STP). In addition, the present invention may have a structure in which the camera apparatus itself transmits the software trigger packet (STP), and performs exposure control for another camera which is connected to the saran IEEE 1394 bus.

What is claimed is:

1. A camera apparatus which includes a random trigger function of controlling exposure timing of an image sensor, based on timestamp information that is included in a software trigger packet received through an IEEE 1394 bus, comprising:
   a cycle timer operation circuit which outputs a cycle timer value that is synchronized with operation of the IEEE 1394 bus;
   an IEEE 1394 packet reception circuit which receives a packet on the IEEE 1394 bus;
   a software trigger packet detection circuit which detects the software trigger packet from a code in an originally provided area of the packet received by the IEEE 1394 packet reception circuit;
   a fixed delay setting circuit which outputs a fixed delay value to perform a fixed trigger delay for the timestamp information included in the originally provided area of the software trigger packet that is detected by the software trigger detection circuit; and
   an exposure control circuit which starts exposure to the image sensor when the cycle timer value, the timestamp information and the fixed delay value are received and when the cycle timer value exceeds a value which is an addition of the fixed delay value and the timestamp information.

2. The camera apparatus of claim 1, wherein the fixed delay setting circuit stores, as the fixed delay value, a value of a clock timing which indicates a desired delay time that is larger than a maximum value of a time width caused by fluctuations in reception timing of the software trigger packet due to fluctuations in traffic including a bus band traffic degree of the IEEE 1394 bus.

3. The camera apparatus of claim 1, wherein the exposure control circuit includes a trigger delay control circuit, a synchronization signal generation circuit, and an image sensor control circuit,
   the trigger delay control circuit includes an adder which adds the fixed delay value to a value of the timestamp information, and a comparator which compares the value of the timestamp information output from the adder with the cycle timer value and outputs a trigger signal when the cycle timer value exceeds the value of the timestamp information, and
   the synchronization signal generation circuit notifies the image sensor control circuit of exposure timing of the image sensor based on the trigger signal, and the image sensor control circuit controls exposure of the image sensor in response to notification of the exposure timing.

* * * * *